United States Patent
Patrocinio Natunes Lopes et al.

(10) Patent No.: US 10,663,940 B2
(45) Date of Patent: May 26, 2020

(54) FELT AND ENVIRONMENT MONITORING SYSTEM AND METHOD

(71) Applicant: VALMET, LDA., S. Joao de Ovar (PT)

(72) Inventors: Raul Fernando Patrocinio Natunes Lopes, Matosinhos (PT); Denis Albert Marie Francois Begasse De Dhaem, Oporto (PT); Luciano Silva Amaral, Oporto (PT); Miguel Bruno Vieira Ribeiro, Trofa (PT); Joao Luis Neto Guimaraes Pereira, Vila de Cucujaes (PT); Jose Fernando Oliveira Da Silva, Ermesinde (PT)

(73) Assignee: VALMET, LDA., S. Joao de Ovar (PT)

( * ) Notice: Subject to any disclaimer, the term of this patent is extended or adjusted under 35 U.S.C. 154(b) by 352 days.

(21) Appl. No.: 15/569,616

(22) PCT Filed: Apr. 27, 2016

(86) PCT No.: PCT/IB2016/052386
§ 371 (c)(1),
(2) Date: Oct. 26, 2017

(87) PCT Pub. No.: WO2016/174588
PCT Pub. Date: Nov. 3, 2016

(65) Prior Publication Data
US 2018/0129178 A1 May 10, 2018

(30) Foreign Application Priority Data
Apr. 28, 2015 (PT) ........................................ 108407

(51) Int. Cl.
G05B 19/042 (2006.01)
G06F 21/42 (2013.01)
(Continued)

(52) U.S. Cl.
CPC ......... *G05B 19/0423* (2013.01); *D05B 37/04* (2013.01); *G06F 21/42* (2013.01);
(Continued)

(58) Field of Classification Search
CPC ...... G05B 19/0423; G05B 2219/25289; D05B 37/04; G06F 21/42; G06F 21/85; G06F 2221/2129
See application file for complete search history.

(56) References Cited

U.S. PATENT DOCUMENTS

| 3,635,158 A | * | 1/1972 | Budinger | ................ | B41N 7/04 |
| | | | | | 101/147 |
| 4,485,974 A | * | 12/1984 | Lass | ....................... | B02C 25/00 |
| | | | | | 241/121 |

(Continued)

FOREIGN PATENT DOCUMENTS

| EP | 1653207 A2 | 5/2006 |
| WO | 96/25288 A1 | 8/1996 |
| WO | 2012172528 A1 | 12/2012 |

OTHER PUBLICATIONS

ZigBee—Wikipedia, the free encyclopedia; XP055291002; Apr. 2015; pp. 1-11.

(Continued)

*Primary Examiner* — Regis J Betsch
(74) *Attorney, Agent, or Firm* — Lucas & Mercanti, LLP

(57) ABSTRACT

This application presents a solution for measuring different physical parameters from the felt and its surrounding environment, such as: pressure, temperature, humidity, pH, airflow and the degradation of the felt. It is disclosed a monitoring system, comprising: an independent measuring unit fixed in a felt, comprising at least one of the following sensors: temperature, humidity, pH, pressure or air flow; a central acquisition unit comprising a microcontroller, a real-time clock, a communication transceiver connected to at least one independent measuring unit and a communication transceiver connected to a computing device; and a polymeric encapsulation material layer. Applications for this technology are the monitoring of the felt and its surrounding (Continued)

environment in, for example, dry filtration, laundries, wet filtration and other suitable applications. Although the system is focused specifically on felt, the same principles could be applied to other types of fabrics with no further modifications to the system.

11 Claims, 12 Drawing Sheets

(51) Int. Cl.
     *G06F 21/85*      (2013.01)
     *D05B 37/04*      (2006.01)

(52) U.S. Cl.
    CPC .... *G06F 21/85* (2013.01); *G05B 2219/25289* (2013.01); *G06F 2221/2129* (2013.01)

(56) References Cited

U.S. PATENT DOCUMENTS

| | | | |
|---|---|---|---|
| 2004/0235630 A1* | 11/2004 | Madden | B29C 53/581 |
| | | | 492/56 |
| 2005/0131652 A1 | 6/2005 | Corwin et al. | |
| 2006/0090574 A1* | 5/2006 | Moore | G01L 5/0085 |
| | | | 73/862.55 |
| 2012/0131353 A1 | 5/2012 | Nasir et al. | |

OTHER PUBLICATIONS

International Search Report dated Aug. 5, 2016 for PCT/IB2016/052386.
Written Opinion dated Aug. 5, 2016 for PCT/IB2016/052386.

* cited by examiner

FELT AND ENVIRONMENT MONITORING SYSTEM AND METHOD

CROSS REFERENCE TO RELATED APPLICATION

This Application is a 371 of PCT/IB2016/052386 filed on Apr. 27, 2016, which claims priority of Portuguese Application No. 108407 filed Apr. 28, 2015, both of which are incorporated herein by reference.

TECHNICAL FIELD

The present application relates to a felt and environment monitoring system, and its method of operation.

BACKGROUND

Fabric is a textile product that can be obtained by weaving or by knitting. The structure of this fabric can be changed by using different forms of interlocking several yarn systems that are used for is production. The type of yarns is also influence the structure of the fabric, such yarns could be Spun, multifilament, monofilament, film yarns, etc, with or without elasticity. For technical applications the most common raw materials are synthetic fibers like for example, Polypropylene, Polyamide, PVDF, Polyethylene, Polyester, Acrylic, m-aramid, Polyphenylene sulfide (PPS) etc or blends of some of these raw materials to get different characteristics on the final product. All this fabrics can be used as raw fabrics or with different finishings to get the necessary properties for the application.

Felt is a nonwoven textile material where is fibers structure can include or not a weaved structure to improve the mechanical characteristics of the final product.

There are different processes to connect or entangle (interlace) the fibers between each other and also with the woven structure (when existing). This process can be done, mechanically by a needling process, or by thermal process like by spun bonding, among others.

For technical applications the most common raw materials are synthetic fibers like for example, Polyester, Acrylic, m-aramid, Polyphenylene sulfide (PPS) etc.

These types of fabrics can be used in many scenarios such as dry filtration, laundries, wet filtration and other suitable applications. In industrial applications, monitoring a felt and the environment where it is used is extremely difficult due to the physical conditions under which it lies.

The prior art knowledge does not provide a robust and effective solution that allows monitoring physical parameters of a felt used in an industrial application.

SUMMARY

The present application discloses a felt and environment monitoring system, comprising:
- at least one independent measuring unit fixed to a felt or on a support structure, comprising at least one of the following sensors: temperature, humidity, pH, pressure or air flow;
- a central acquisition unit comprising at least a microcontroller, a real-time clock, a communication transceiver connected to the at least one independent measuring unit and a communication transceiver connected to a computing device; and
- a polymeric encapsulation material layer, wherein the polymeric encapsulation material layer has a thermal conductivity between 0.18 and 0.68 W/mK, a viscosity between 2000 and 10000 mPa·s, and a thickness between 3 and 6 mm.

In one embodiment, the transceiver connected to a computing device is a wireless communication interface.

In another embodiment, the transceiver connected to the at least one independent measuring unit is a RS-485, Profibus, Modbus, CAN or ZigBee communication interface.

In one embodiment, the independent measuring unit comprises the sensors and the acquisition electronics located in different structures ("islands") in order to improve the heat barrier.

In another embodiment, the material is any of: RTV silicone or epoxy.

In a further embodiment, the central acquisition unit is connected to the at least one independent measuring unit by an interconnection ribbon with integrated conductive wires.

In one embodiment, the central acquisition unit comprises an inertial sensor.

In another embodiment, the central acquisition unit comprises:
- a unique authentication key, set by the computing device App, in order to guarantee environment conditions only with approved felts; and/or
- the continuous measurement of a well-known resistance, embedded only on the approved felts.

In a further embodiment, the system comprises at least one secondary acquisition unit comprising a communication transceiver connected to between 20 to 100 independent measuring units.

In one embodiment, the at least one independent measuring unit fixed to the felt or on its support structure, is uniformly distributed on the felt.

In another embodiment, the at least one independent measuring units fixed in a felt or on its support structure, is placed between two layers of felt.

The present application also discloses a method of operating a central acquisition unit of a felt and environment monitoring system, comprising the steps:
- detecting if the system does not sense movement for a specific time, entering in standby; and
- disabling the acquisition and transmission of data from the at least one independent measuring unit fixed in a felt or on its support structure.

The present application further discloses a method of operating a computing device connected to a communication transceiver of a central acquisition unit of a felt and environment monitoring system, comprising the steps:
- retrieving felt sensor data from the connection to the central acquisition unit;
- displaying said sensor data in a display screen interface;
- verify the authentication key in order to validate if an approved felt is installed;
- perform configuration parameters of the central acquisition unit and also the independent measuring units attached to it; and
- control different parameters of the at least one related factory equipment, connected in the network.

General Description

The present application presents a solution that intends to solve the problem of measuring different physical parameters from the felt and its surrounding environment, such as: pressure, temperature, humidity, pH, airflow and the degradation of the felt.

A felt and environment monitoring system, comprising:
at least one independent measuring unit fixed to a felt or on a support structure, comprising at least one of the following sensors: temperature, humidity, pH, pressure or air flow;
a central acquisition unit comprising at least a microcontroller, a real-time clock, a communication transceiver connected to the at least one independent measuring unit and a communication transceiver connected to a computing device; and
a polymeric encapsulation material layer.

The central acquisition unit interacts with a variable number of independent measuring units. This central acquisition collects the data from all of the measuring units and relays them to the external system. This central acquisition unit also supplies power to the independent measuring units, which in a preferential implementation can be made by using primary batteries; The power supply to the system can be provided in different ways such as a direct connection to the electrical grid, use of batteries or the use of an energy harvesting device, such as a thermogenerator that can be installed in the calendar to generate energy from the heat difference between the equipment and the surrounding air.

The computing device processes, stores and displays the data from all of the measuring units. In one embodiment, this device comprises an embedded system based on the Android platform. An application is installed and is responsible for managing and presenting the information coming from the independent measuring units.

The temperature where the sensors are used may reach high values, above 200° C. in some cases, and the industrial standard electronic components do not resist such high temperatures. Hence, as the measuring system is used in extreme environments (temperature, pH, humidity, etc.) the electronic components must be protected. Therefore, the electronic parts of the system are embedded in an encapsulation material, such as RTV silicone or epoxy, that withstand high temperatures and has a very low thermal conductivity, typically between 0.18 W/mK to 0.68 W/mK, minimizing the heat transference from the exterior to the electronic components. The material is applied by potting into a specific mold, holding the electronics, which is customized for the application. In order to have a good adhesion and a homogeneous dispensing, the material should have a low viscosity, typically between 2000 to 10.000 mPa·s.

There are several limitations regarding the use of these protective layers and one of the limitations is the available space. Due to process of application of the independent measuring units, a very thin layer of coating, from 2 to 6 mm, can be used, requiring the application of encapsulation materials with a very low thermal conductivity and resistance to high temperatures. Some examples of these materials that can be used are QSIL550, QLE1102 or QSIL556, from ACC Silicones. These materials have a maximum operating temperature between −5° C. to 275° C. and a thermal conductivity between 0.18 W/mK to 0.68 W/mK which makes them suitable to be used in these applications.

Furthermore, in order to increase the thermal isolation, preferably, the acquisition electronics is separated from the sensors, being connected only by an interconnection ribbon with integrated conductive wires, this way avoiding the thermal conductivity through the copper of the printed circuit board (PCB).

Nevertheless, it is possible to have an all-in-one PCB with all the acquisition electronics and sensors, however the thermal inertia would be much lower.

The monitoring system continues to measure even if the equipment where it is installed is not working, i.e. no movement on the calendar. This leads to an increase of the energy consumption that results in a lower autonomy of the system, if powered from batteries, and a large quantity of data that is not useful. In one embodiment, the monitoring system is equipped with at least one inertial sensor that detects when the equipment is working and starts monitoring and recording the information from each one of the sensors. If the system does not detect movement for a specific period of time it will enter in a standby status conserving this way energy and memory space.

The installation of the independent measuring units in each one of the sleeves requires the introduction of one cable with at least four conductors for each unit. Considering that the number of sleeves in a filter can be in order of hundreds or thousands the required number of cables coming out of the filter would be extremely high, regarding this, as a preferred implementation the idea is to measure by defining sensing areas. So, each filter would have only a few sensing systems, which will be dependent on the number of sleeves, in different locations. Nevertheless, each sensing system cannot be directly connected to the central acquisition unit, so the solution is to have concentrators (secondary acquisition units) that connect between 20 to 100 sensing systems. Each concentrator connects to the central acquisition unit. Afterwards the information is sent wirelessly to the client application.

The starting idea was to integrate the sensors directly in the felts during their production. During the production of the felts they undergo a needling process in which needles are pushed through the felt thousands of times to assure that they are compact. This process would destroy any electronic component that would be placed along with the textiles. The alternative process that was adopted was the assembling of the sensing systems in separated structures, so, the idea is to have "islands" which monitor the parameters in each one of the areas, connected as a network, preferably as a master-slave typology, where the master is the central acquisition unit, connected to the client software application, and the slaves correspond to each one of the sensing systems. This is the preferred embodiment.

In the system to be installed in the felts for ironing equipment the monitoring system should be as small as possible. The independent measuring units are to be placed between the two layers of the felt. In order to minimize the impact in the operation of the equipment the units must be as small as possible so that they do not leave any marks in the textiles that are being ironed and don't damage the calendar.

pH measurement sensor in industrial laundries should handle high temperatures. In order to measure pH during the process, the sensor must handle continuous temperatures, up to 210° C., and also must be as thin as possible in order to be placed in between the two layers of the felt without leaving any marks in the textiles that are being ironed. The issue is that actually it does not exist pH sensors as thin as needed and at the same time able to handle such high temperatures. The alternative, in a preferential implementation, is to have an external measurement portable device (powered by rechargeable batteries), which allows the measurement in several points of interest, simply by clicking in a push button to start a measurement. After each measurement the user can directly send the data to the client system, by means of a built-in wireless interface, for example Zig Bee. The information is automatically validated by the client App and stored in the local database. User can perform measurements whenever needed. This portable device is, this way, completely integrated into the system network, being this interaction completely transparent to the user and in the end becoming completely centralized together with the other monitored parameters.

The typical applications for this technology are the monitoring of the felt and its surrounding environment in different applications, like, for example, dry filtration, laundries, wet filtration and other suitable applications.

Although the system is focused specifically on felt, the same principles could be applied to other types of fabrics with no further modifications to the system.

BRIEF DESCRIPTION OF DRAWINGS

For easier understanding of this application, figures are attached in the annex that represents different embodiments which nevertheless are not intended to limit the technology disclosed herein.

Reference symbols in the figures:
a—textile connection between the components with integrated conductive wires
b—polymeric protective coating
c—sensor area with no protective coating
d—central acquisition unit
e—electronic components protected by the polymeric coating
f—individual module with integrated electronics with protective coating
g—individual module with sensors not covered by the polymeric coating
h—flow sensor
i—sensors and pcb with electronic components
j—protective casing
k—support for attaching to the wires in the cage frame

DESCRIPTION OF EMBODIMENTS

Figure 1:
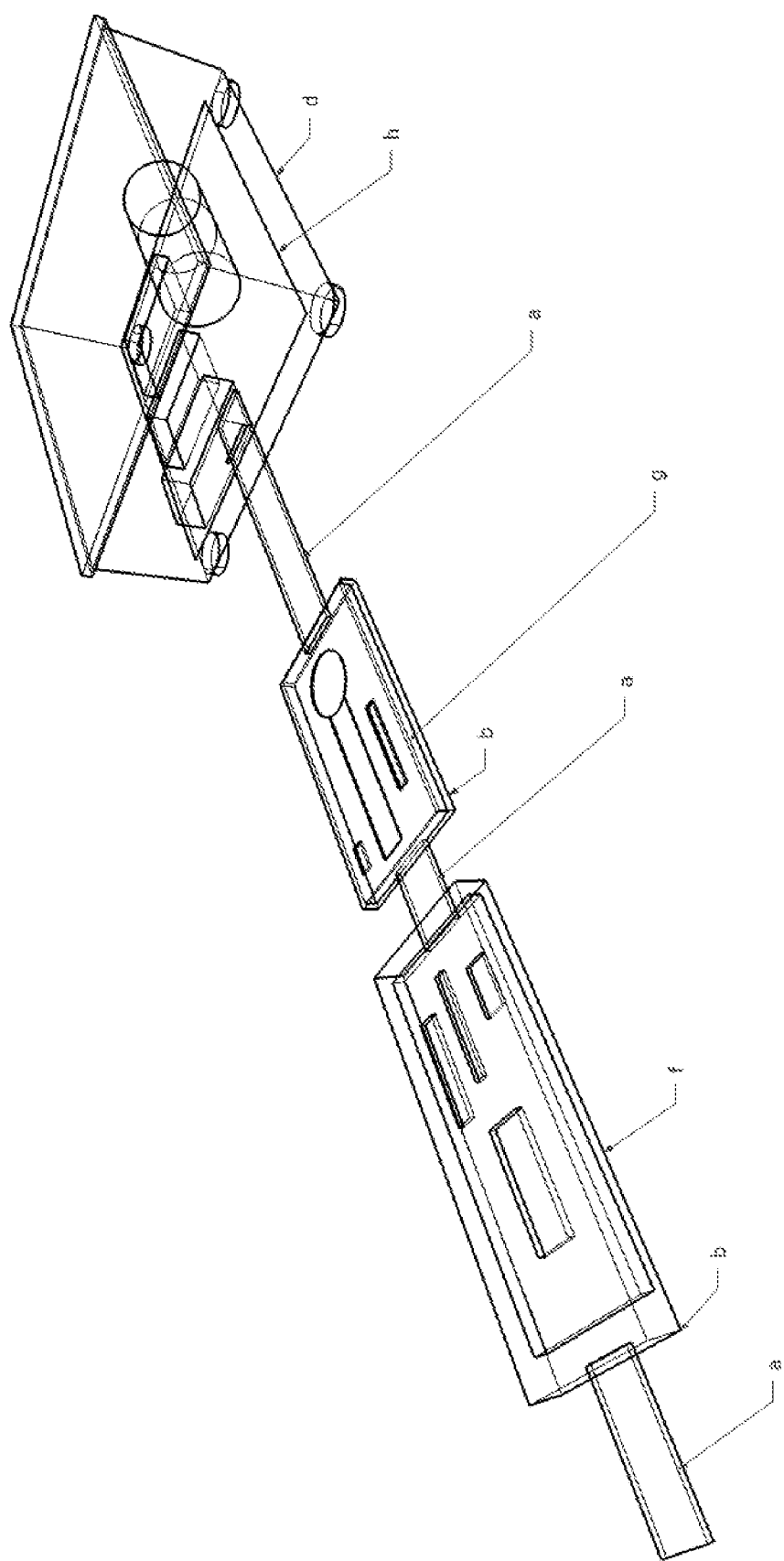
FIG. 1 illustrates a central acquisition unit connected to its sensing units. In this embodiment the sensing units are divided in the sensor area (example: temperature, humidity, pressure sensors, etc.) and acquisition electronics. This approach is to be applied to laundries.
Figure 2:
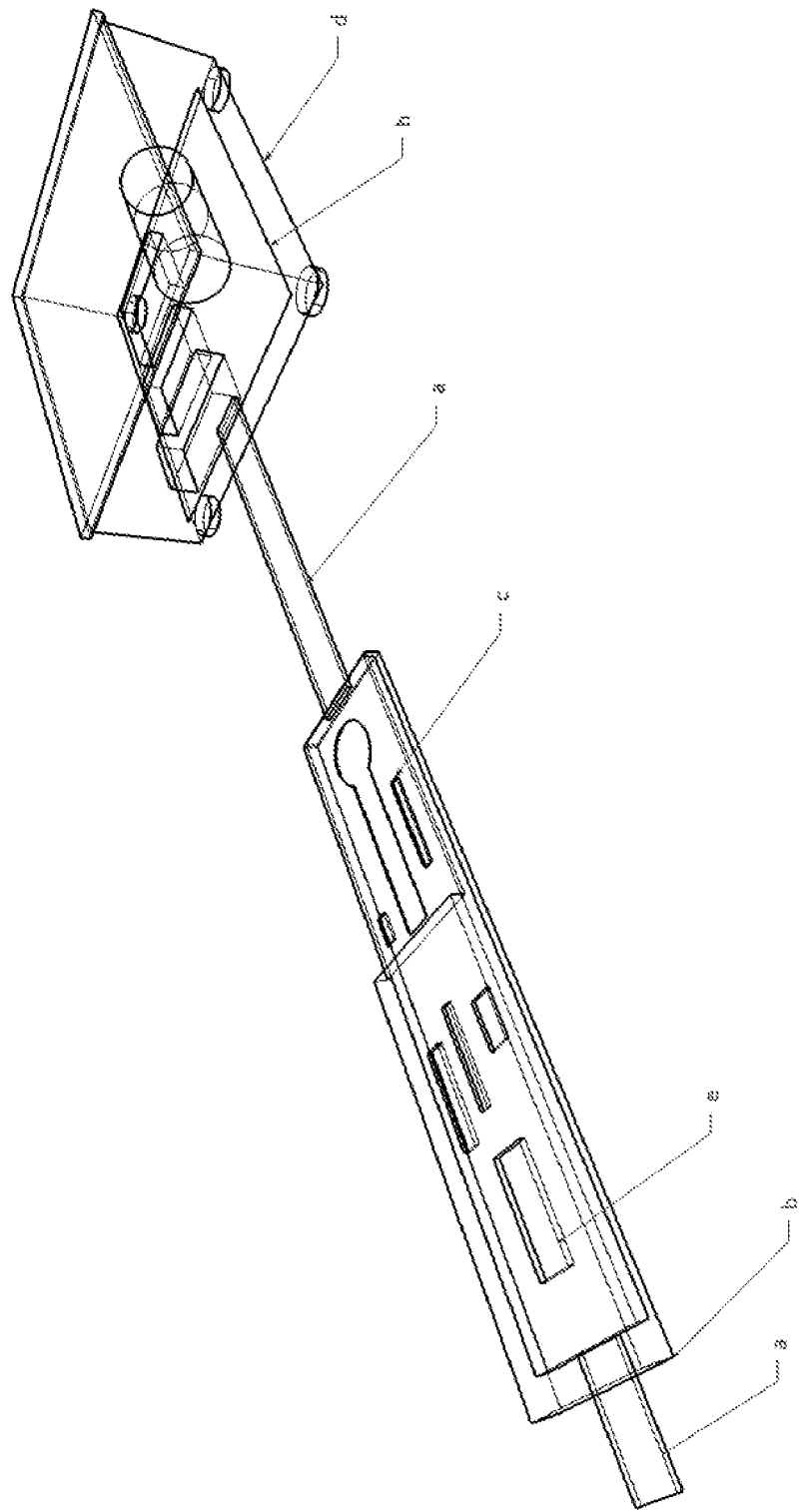
FIG. 2 illustrates a different approach of the central acquisition unit connected to its sensing units. In this embodiment the acquisition electronics and the sensors are combined in only one structure. This approach is to be applied to laundries.
Figure 3:
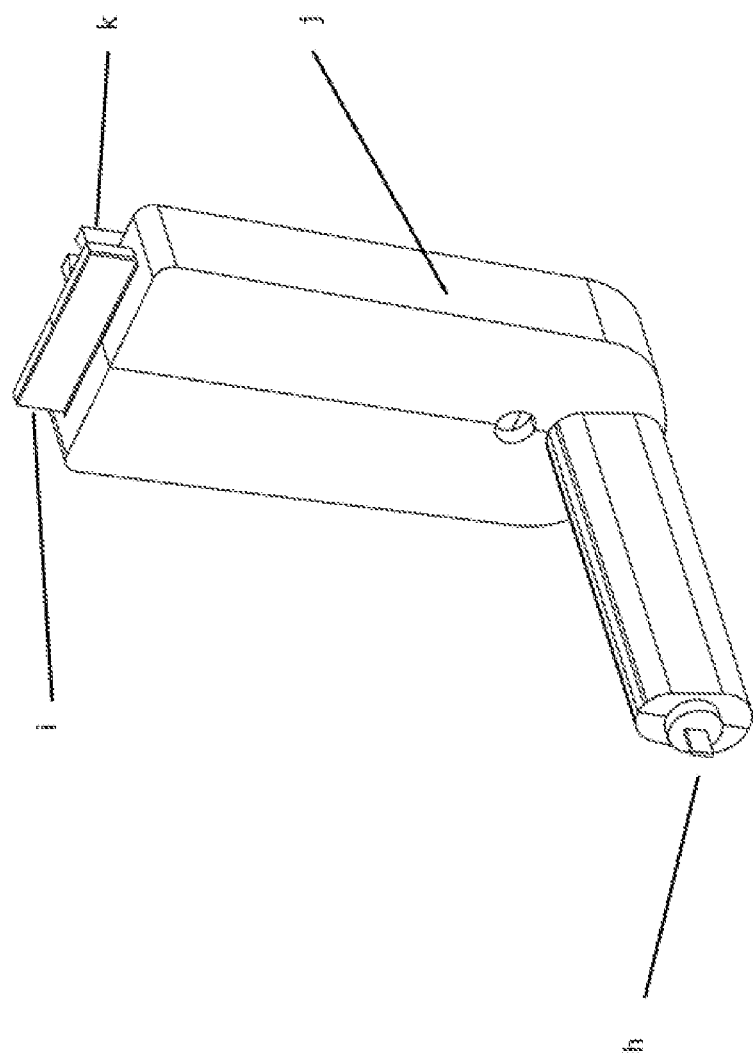
FIG. 3 illustrates the protective case that supports the sensing unit which is to be applied to, for example, dry filtration. This unit comprises several integrated sensors, such as temperature, humidity, air flow, and also all the related acquisition electronics. This unit is to be connected to a central acquisition unit.
Figure 4:
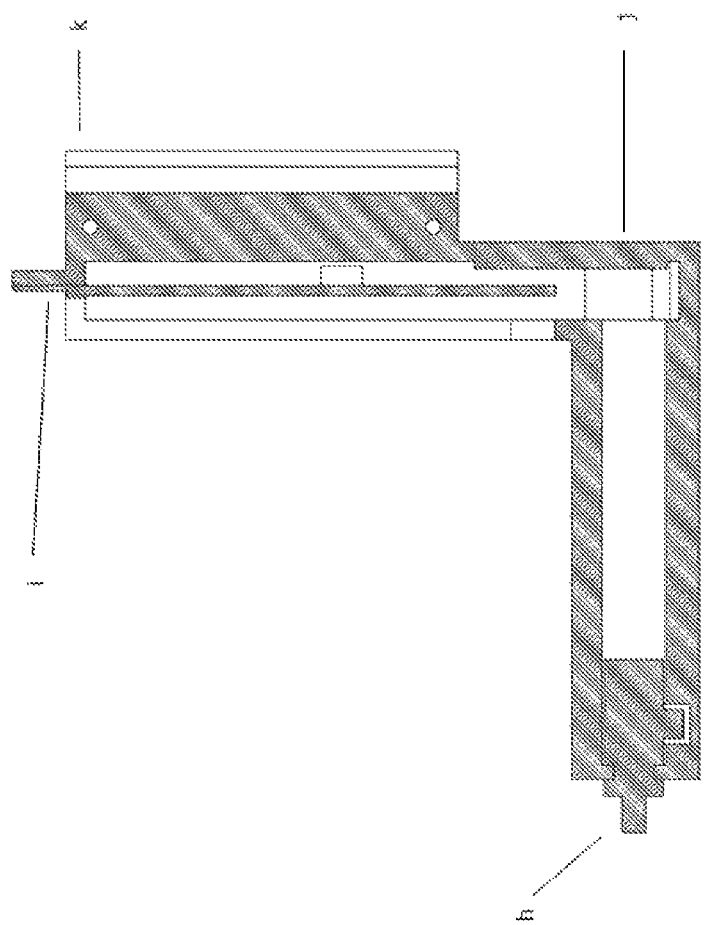
FIG. 4 illustrates the cavity of the sensing unit's protective case, which is to be filled with an encapsulation material.

The following text provides an explanation on the different embodiments of the technology disclosed in the present application. This explanation is not an extensive overview and does not intend to delineate the scope of the protection or any critical aspect or element of the same technology.

The system can be implemented in three different ways, depending on the application in which it will be used, for example dry filtration, wet filtration or industrial ironing equipment. The sensors that are used, the mechanical supports, the layout of the sensors on the electronic board, and the protective layers must be adapted for each solution to be implemented. Although there are some differences in the system implementation, the core technology and the types of sensors that are used are common to all of the systems.

In one embodiment, the system is used in industrial ironing machines. These have different rotating rolls that have springs in the surface that push the linen (textiles) against a heated chest. The springs in the rolls are covered by at least one layer of a needled felt that is used as a layer between the springs and the textiles pushing them against the heated chest. The textiles are driven between the two components in order to completely dry them and to iron them. The felts can be placed in different ways depending on the type of equipment that is used. There are different ways in which the felt can be used: using a thicker felt, with thickness between 10 and 20 mm, that does not overlap or to use thinner felts, with thickness up to 2.0 and 6 mm, in which case there is the overlapping of at least two layers of the felt. In the first case, the felt ends have to be sewn by hand in place to assure that the felt is kept in the correct position while in the second case the felt edges are tuck in the lateral part of the roll assuring that it is kept in place. There are other possibilities of installation of this type of felts using cords in the edges.

Different equipments may have different dimensions, among others, the roll's diameter and widths, and also may have a different number of rolls, which depends on the required throughput for the equipment. All the calendars are heated to completely dry and iron the textiles. In this process there are several parameters that are important to monitor to assure the correct operation of the equipment such as pH temperature, humidity, pressure and the felt plugging.

From the studies that were performed, it was verified that the operating temperatures of the calendars can go up to 210° C., normally between 150-210° C., and there is a considerable pressure that can be applied between the rolls and the heated chest depending on the equipment. In the laundry process, there are different steps to wash the textiles. In some of the steps, alkaline solutions are used, with a pH that can go up to 11-12. After these steps a rinsing step is used to assure that the pH of the textiles is lowered to values below 7. If there is some problem with the washing cycle, the textiles that are placed in the ironing machines may have an inadequate pH leading, in combination with the high temperature and humidity, to the hydrolysis of the felt and a premature replacement, resulting in higher costs of operation.

Said embodiment for industrial ironing equipment comprises independent measuring units, which are connected to each other by conductive metallic wires. These wires are interlaced in a textile support that can be composed by different materials such as m-aramid or others which can withstand the working conditions.

The conductive metallic wires are used to transport the information from each measuring unit using a RS-485 based communication protocol. In the areas close to the independent measuring units, the textile support is surrounded by a velcro that can be made of different materials, such as polyester, aramid or metallic materials, such as steel, in order to assure that it adheres to the felt, in order to limit the movement of the measuring equipment during its operation.

The independent measuring units are thin structures with dimensions between 2 to 6 mm already considering the polymeric coating. These units must be as small as possible since they are to be placed between two layers of the felt and the impact in the ironing equipment must be minimal. At one of the extremities, one of the independent measuring units is connected to the central acquisition unit that is placed on the side of the roll since its dimensions don't allow it to be placed on top of the roll. This unit gathers the data form the different number of measuring units and sends it, using wireless technology, to the external systems. The wireless technologies that can be used are Zig Bee, Bluetooth Low Energy, among others with low power consumption.

The energy required to operate the independent measuring units and the central acquisition unit comes either from a battery, preferably a primary Li-Ion battery, that has to be periodically replaced, in a period from 3 to 6 months, depending on the operating conditions, namely the acquisition and communication cadence, or from a thermogenerator that generates energy, which in a preferential implementation is based on the temperature difference that exists in the ironing equipment.

In a second embodiment, the present solution is used in dry filtration. The dry filtration environment corresponds to the application of the felts as filtration sleeves that are used in industrial air filtration for filtering solid particles. The filters installed usually in chimneys can have hundreds or thousands of filtration sleeves depending on the size of the industrial facility. The sleeves can have different shapes, round or rectangular with round corners, depending on the equipment where they will be installed and their diameter and length may vary between from few meters up to 20 meters. The selection of the materials used for the felt production depends on the application parameters, namely running conditions in the filters as temperature, pH raw gas composition, dust particle sizes, among others. The most common materials used are, polyester, m-aramid, polypropylene, acrylic, polytetrafluoroethylene, polyimide, polyphenylene sulfide, glass, among others.

Typically, the felts are placed around a cage made of metallic wires that maintain the final shape of the felts during operation. The felts have to withstand the different pressures that are applied coming both from the pressure of the air leaving the filter and also the pulse of air that periodically is injected in the sleeves to remove the particles that are accumulated in the exterior of sleeves.

The conditions in which the felts are used depend on what type of industry they are intended for, and they may be used in extreme conditions with very high temperatures and the presence of gases that may degrade the materials that are used. As an example, the temperature inside a filter installed in a cement fabrication facility can exceed temperatures of 200° C. in continuous operation, which requires the use of very specific materials such as glass or m-aramid.

With the use, the felt suffers some degradation which drives to a reduced performance, i.e. with a decreasing permeability, and that may lead to ruptures in the filtration sleeves. Since the filters may be composed by hundreds or thousands of sleeves, in case of rupture of one of them it is necessary to stop the equipment to which the filter is associated and verify one by one all of the sleeves to replace the ruptured one, which is a time consuming process.

In said embodiment, the system is composed by independent measuring units that are placed near the top of the filtration sleeve. In this form of implementation the following sensors can be used: temperature, humidity, pH and airflow.

The installation must be done near the top of the sleeve in order to detect the changes in the airflow that may indicate that the sleeve is either saturated, i.e. with a decrease of airflow, or has ruptured, i.e. occurs a sudden increase in the airflow. The flow sensors are used has a method for detection of the degradation of the sleeve and also to detect if there is any rupture in the sleeve, that must then be replaced.

In this embodiment, there is more available room space for the installation of the system, so a protective case can be used. This protective case embraces the electronic system and has also an additional support for the flow sensor that protrudes from the casing placing the flow sensor in the center of the sleeve. The case has, in the back, a fitting that adapts to the metallic wires of the cage in order to keep it in place.

Each one of the independent measuring units is connected by wire to the central acquisition unit that at the same time provides electrical power. The central acquisition unit is connected to the external system either by wires or by wireless technology depending on the properties of the filter in which the sleeves are installed.

The preferential process to supply electrical power is the direct connection to the electrical grid that is typically available where the systems are installed, not requiring an autonomous energy source.

The external systems can be placed away from the area to be monitored and more accessible to the users. This part of the system has the software that will acquire, process, store and display the data from all the sensors that are being used.

In a third embodiment, for use in wet filtration, the sensor has similar structure to the application in the industrial ironing machines that can be integrated in filters in industrial installations. These filters are used to separate solids from liquids where the solids or the liquids are the end product. These filters are used in several industries as for example, Pulp & Paper production, chemical industries, mining industries.

System Architecture

Figure 5:
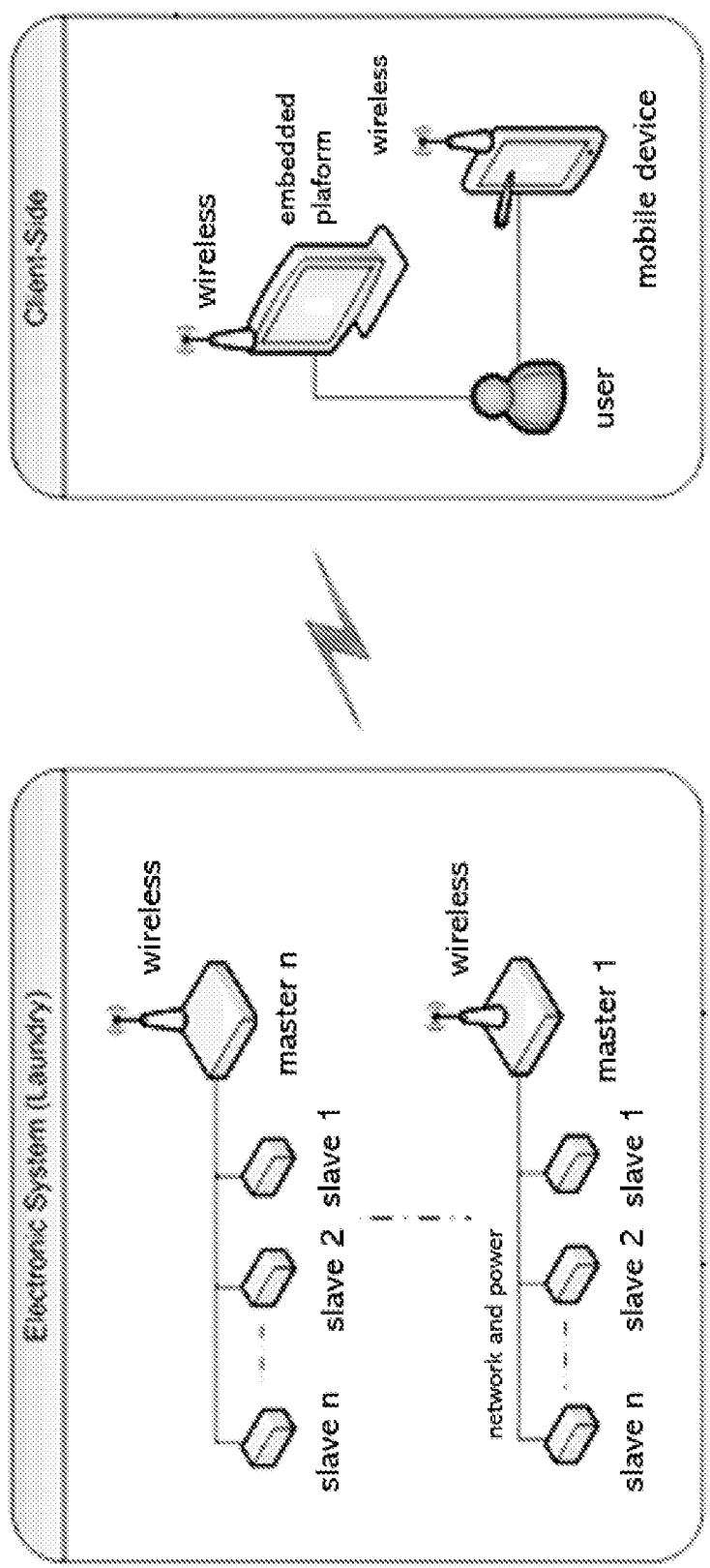
FIG. 5 illustrates a preferential implementation of the system architecture, especially applied to laundry felts.

Both industrial laundry and filtration systems are based in a master-slave typology for the electronic system side communication and a client-server typology for the client information presentation. Regarding the industrial laundry system, the preferential implementation is shown in FIG. 5, where the central acquisition unit is the master and the sensing units located across the felt are the slaves.

Essentially, the master sends requests and each one of the slaves respond accordingly, sending its acquired parameters. This data will be temporarily stored by the master, which then sends, periodically (user-defined cadence), the information about all the received parameters, to an external system which is preferably an embedded Android-based platform. Nevertheless, other embedded platforms (Windows CE, embedded Linux, etc.) or mobile devices can be used. In this implementation the client and the server are present in the same device. The system can have several masters and slaves, giving enough flexibility to apply it in equipments that have several rolls. In practice, the limitation resides in the communication protocol number of simultaneous connections. Preferably, due to the movement of the rolls, the communication between the master and the external system should be performed wirelessly and the power supply of the electronic system should be done by using batteries.

Figure 6:
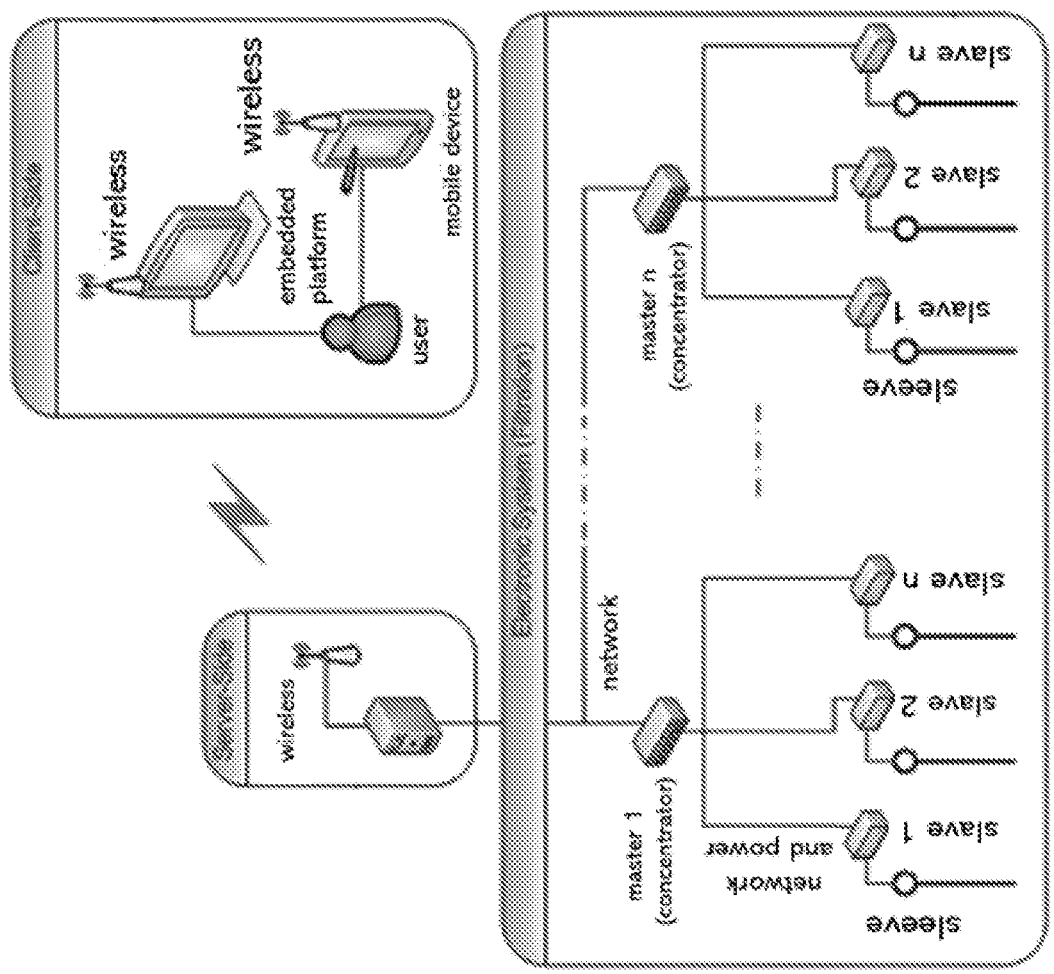
FIG. 6 illustrates a preferential implementation of the system architecture, especially applied to dry filtration felts.

Regarding the filtration system, the preferred implementation is shown in FIG. 6. In this approach each one of the sensing units (slaves) from the sleeves is connected to a concentrator (master), by means of a cable network connection for communication (network 1) and power supply. These concentrators, similarly to what happens in the architecture from FIG. 5, also send requests to the network 1 and each one of the slaves respond accordingly. Every concentrator is connected to the power grid. Another cable network (network 2), is responsible for handling the communication between concentrators and the server, which will process and store all the data sent, periodically as user-defined, from those units. The server is not located near the chimney, like the other elements of the system, this device is to be located externally, for example on the server room of the factory facilities. In order to visualize the acquired parameters, a client embedded platform running Android, for example located on the factory control room, allows user to monitor all the collected data, by means of a wireless client-server connection.

Client Interface with Industrial Equipment

Both architectures, FIGS. 5 and 6, were designed having in mind scalability, therefore the client (external system) is always able to interact with factory equipment. Taking as example industrial laundries, the client embedded platform is able to control actively some of the equipment parameters based on the monitored data, such as the roll speed, calendar temperature, etc., as long as the equipment offers any type of industrial digital interface, such as RS-485, Profibus, Modbus, CAN, ZigBee, etc. Therefore, the industrial equipment can be a part of the system network, increasing the equipment adaptability to different conditions and consequently improving the process's performance.

About the Software (Client Application)

The software developed in android environment is common to all of the three possible implementations only requiring the definition of the different sensors to be used in the process. The software is responsible for communicating with the central acquisition unit (or units) to get the values measured by the sensors, to process and store the data, display the information for the user and generate alerts in case any of the values is outside a range defined by the user. The system displays the data acquired by the sensors in the last few minutes (depending on the transmission cadence) and stores the data of each day.

The external system in which the software is installed can communicate with a variable number of central acquisition units, depending on the number of simultaneous connections limitation defined by the wireless interface in use. The communication can be done using a physical connection or by wireless technologies, preferably, such as Wi-Fi, Bluetooth Low Energy or Zigbee, depending on the operating conditions and the distance between the systems. If the distance is larger than 100 meters than preferably Wi-Fi should be used while for shorter distances Zigbee or Bluetooth Low Energy is preferred, since it also has lower energy consumption.

Figure 7:
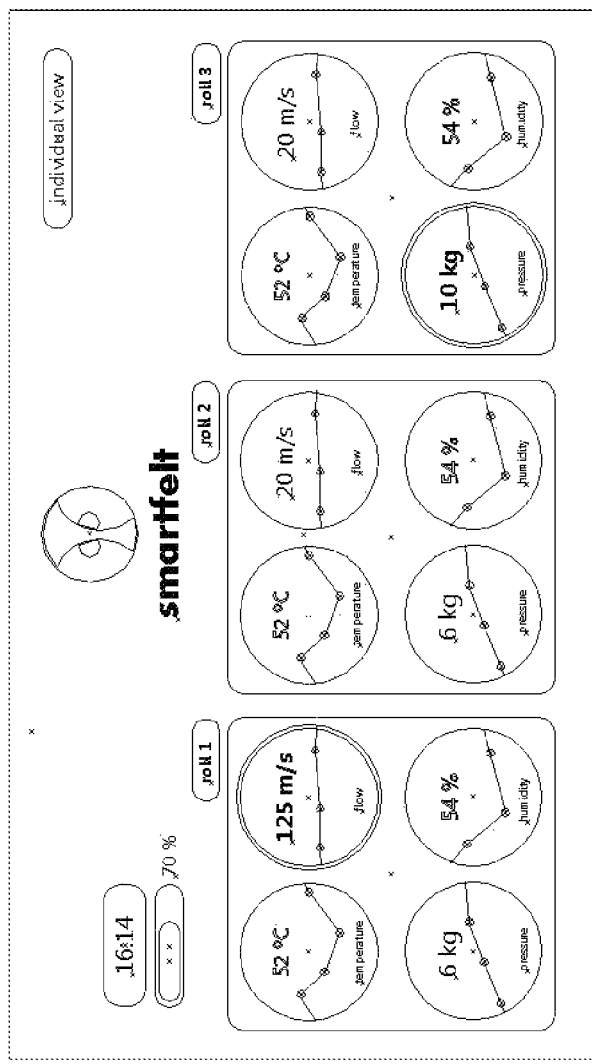
FIG. 7 illustrates a screen of the App showing the possibility of monitoring several parameters from several rolls, as a full view.
Figure 8:
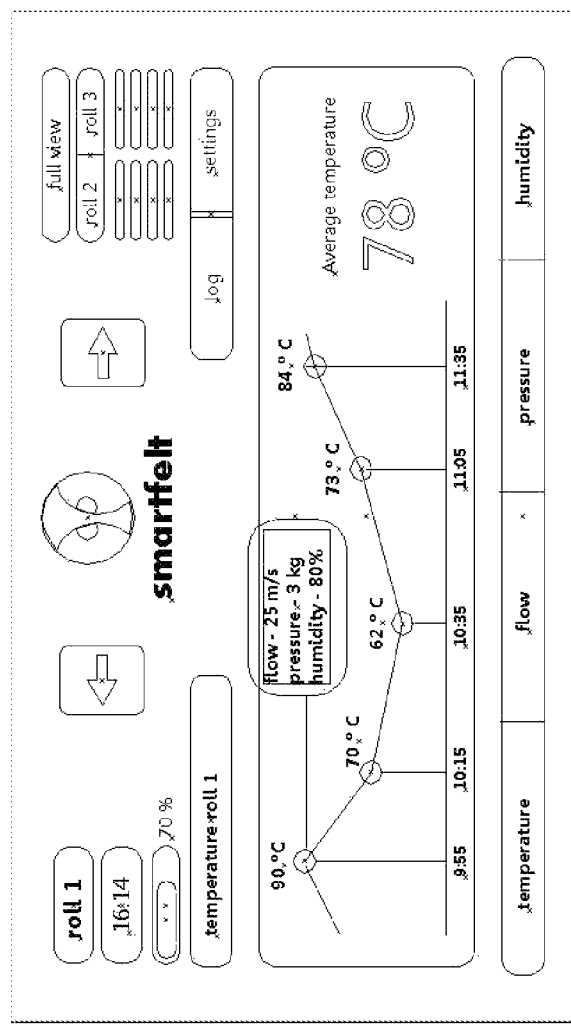
FIG. 8 illustrates a screen of the App showing the possibility of monitoring the evolution (graphical form) of each one of the measured parameters, by roll.
Figure 9:
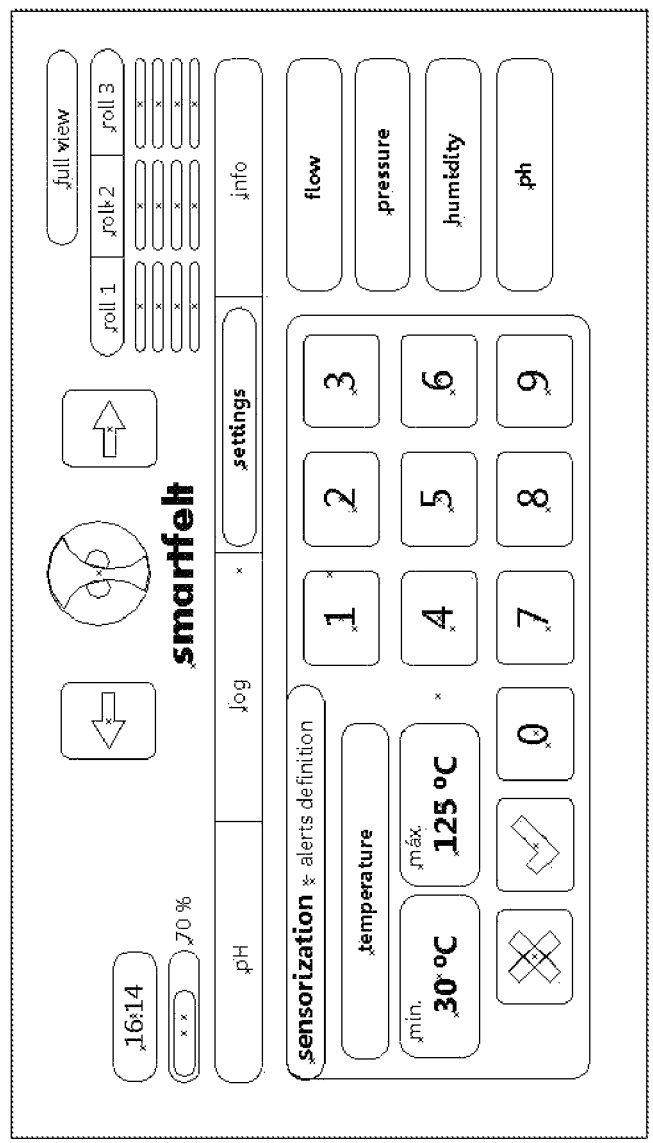
FIG. 9 illustrates a screen of the App showing the possibility of setting several alert definitions, such as minimum or maximum thresholds, for each one of the parameters, by roll.
Figure 10:
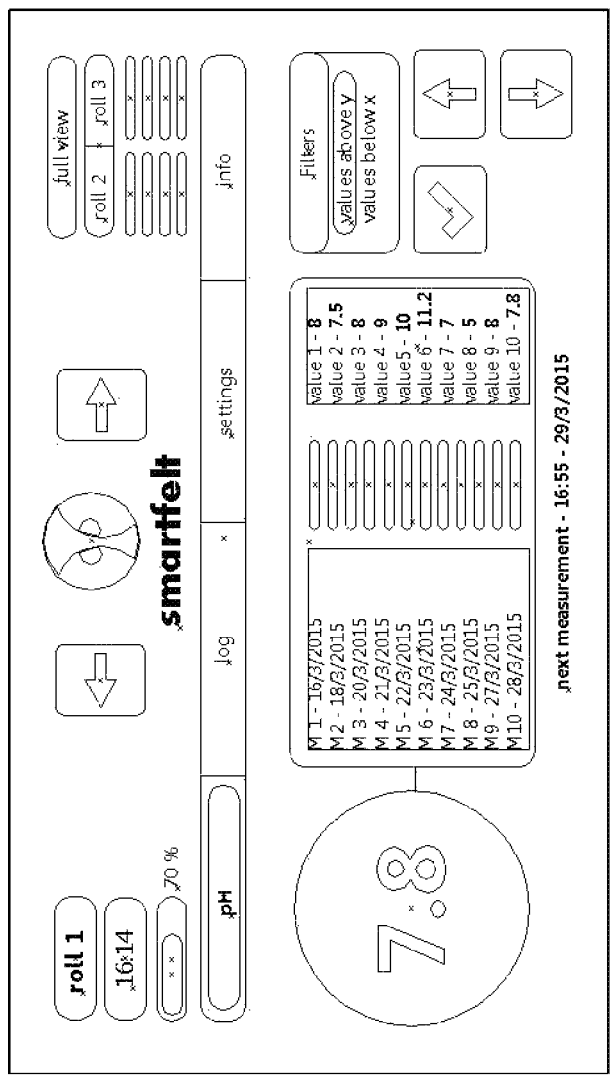
FIG. 10 illustrates a screen of the App showing the possibility of having a history analysis of the acquired data.

The client App functionalities are transversal to the three possible implementations, nevertheless, to have a more detailed description it will be presented, as a reference, some screenshots applied to laundry felt monitoring. One of the possible visualization layouts of the main screen, FIG. 5, presents the instant and last measured values, as useful information to the operator of the equipment. This way it is possible to know immediately the measured values giving to the operator a first overview, indicating if everything is ok with the process. This screen is intended to provide a resume of the environment conditions of the equipment without displaying excessive information. Additional information is provided in this screen such as the hour/date, the percentage of battery charge, in the cases where the central acquisition system and sensing units are powered by batteries, and displays alerts if any of the parameters values are exceeded, given a pre-defined alert configuration. The FIG. 7 shows a three roll visualization, however, instead of rolls it can be presented sleeves, for dry filtration monitoring, all the user interaction would still be the same. If required, the user can enter in a second screen, FIG. 8, where it is possible to access to more detailed information about the measured parameters. The user can choose what parameters he wishes to visualize and what areas of measurement he wants to be displayed. The user then has access to the evolution of the parameters in the last, for example, ten previous acquisition updates (user-defined in the configuration area), being able this way to analyze the evolution of the system while checking if there is an abnormal behavior. In a similar way, the software developed to the dry and wet filtration application allows to monitor the different parameters in the different areas where the monitoring system is installed. The FIG. 9 represents the screen where it is possible to configure alerts, regarding the operating conditions. One of the functionalities of the software is the possibility of configuring a range of values for each measured parameter that are considered to be normal operation conditions. If this range, defined by the user, is exceeded when the equipment is working, a visual alert is displayed in the main screen giving an indication to the operator that there is some problem with the equipment that should be verified. It is also possible to view a history analysis of the measured parameters during the lifecycle of the felt, FIG. 10 shows an example of a pH analysis where it is possible to apply filters for a better visualization. The information history can also be presented as an evolution graphic, such as the one presented for the more detailed visualization of the parameters (FIG. 8).

Communication Data Flow Mechanism

Figure 11:
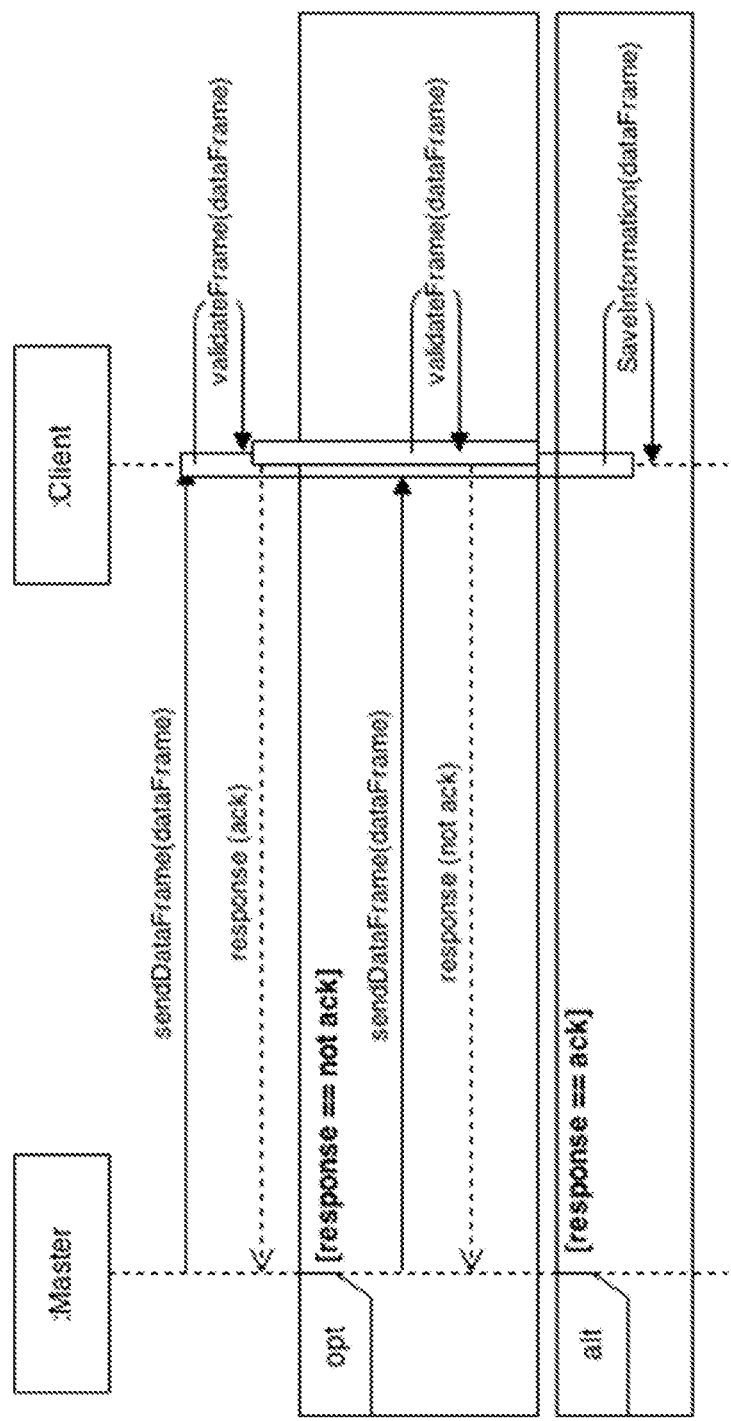
FIG. 11 illustrates the sequence diagram for sending a data frame from a master to the client (external system).
Figure 12:
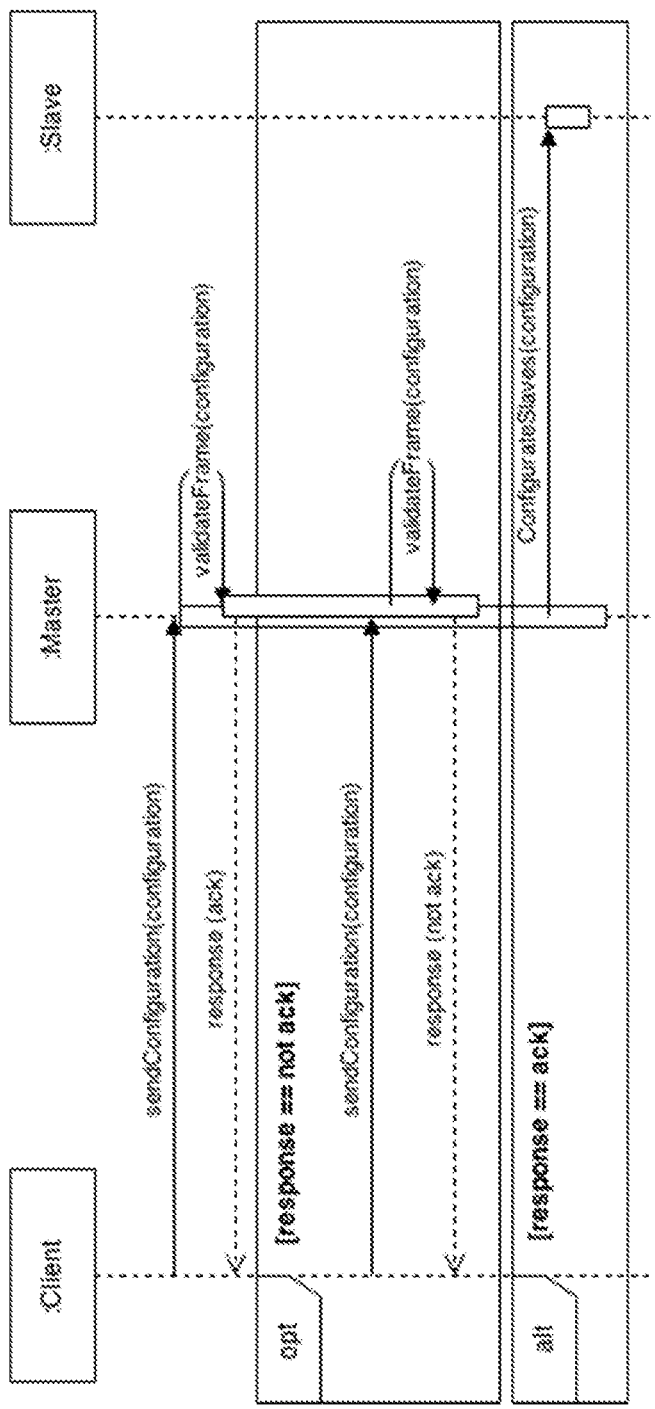
FIG. 12 illustrates the sequence diagram for a user configuration of a master device and/or slaves.

For a better understanding of the data flow, FIG. 11 shows the mechanism used in order to communicate between a master and the external system (client), while FIG. 12 illustrates the method for user configurations of a master and eventually the slave units. In the master-client communication, as a preferred implementation, a master sends the information through a wireless connection (sendDataFrame method), when the client receives the data frame it starts the checksum validation (validateFrame method), responding with an acknowledgement if the data is consistent and storing it in the database, otherwise, the client sends a not acknowledgment and the data is re-sent by the master, for a new validation process. In a master re-configuration, required by the user, as a preferred implementation, the client sends the new configuration data to the master (sendConfiguration method), which replies with an acknowledgement after checking the data consistency (validateFrame method) and also after slave configuration, if required in the data frame (ConfigurateSlaves method), otherwise, master sends a not acknowledgment and the configuration data is re-sent by the client, a new validation is then performed.

About the Firmware

For the specific firmware is developed for the independent measuring systems in order to acquire data from all of the installed sensors and communicate the data to the central acquisition unit. The firmware is adapted in function of the type and number of sensors that are used in each system.

Authenticity of the Felts

In order to assure that the systems are only used with authorized felts/fabrics, two different systems are implemented. One system is software based and consists in a software key that is given to the user when a felt is bought, which is inserted in the software by the user. The system will then start working, acquiring and displaying data, during a specific period that can be defined by the seller, depending on the expected lifetime of the felt that is installed. When the period of time is exceeded and if the felt is not replaced by a new one that is accompanied by a new software key, the software will display a message stating that the utilization period has expired and a new key should be inserted.

A second system is hardware based and requires the integration of a wire, with a well know electrical resistance, in the felt that will later be attached to the central acquisition unit that will recognize the value of the resistance. If the value is in a range previously defined the software will work properly. If the measured electrical resistance is outside of the range the software displays a message informing that an allowed felt is not detected and the connection between the felt and the measuring system should be confirmed.

Naturally, the present solution are not in any way limited to the embodiments described in this document and a person with average knowledge in the field will be able to predict many possible changes to it without deviating from the main idea, as described in the claims.

The invention claimed is:

1. A felt and environment monitoring system, comprising:
    at least one independent measuring unit fixed to a felt or on a support structure, comprising at least one of the following sensors: temperature, humidity, pH, pressure or air flow;
    a central acquisition unit comprising at least a microcontroller, a real-time clock, a communication transceiver connected to the at least one independent measuring unit, an inertial sensor, and a communication transceiver connected to a computing device, wherein said central acquisition unit is configured to set the system in standby status if detecting that the system does not sense movement for a specific time and disabling the acquisition and transmission of data from the at least one independent measuring unit fixed in a felt or on its support structure; and
    a polymeric encapsulation material layer, wherein the polymeric encapsulation material layer has a thermal conductivity between 0,18 and 0,68 W/mK, a viscosity between 2000 and 10000 mPa.s, and a thickness between 3 and 6 mm.

2. System according to claim 1, wherein the transceiver connected to a computing device is a wireless communication interface.

3. System according to claim 1, wherein the transceiver connected to the at least one independent measuring unit is a RS-485, Profibus, Modbus, CAN or ZigBee communication interface.

4. System according to claim 1, wherein the independent measuring unit comprises the sensors and the acquisition electronics located in different structures.

5. System according to claim 4, wherein the material is RTV silicone or epoxy.

6. System according to claim 1, wherein the central acquisition unit is connected to the at least one independent measuring unit by an interconnection ribbon with integrated conductive wires.

7. System according to claim 1, wherein the central acquisition unit comprises:
    a unique authentication key, set by a computing device App, in order to guarantee environment conditions only with approved felts; and/or
    at least one measurement unit configured to perform continuous measurement of a well-known resistance, embedded only on the approved felts.

8. System according to claim 1, comprising at least one secondary acquisition unit comprising a communication transceiver connected to between 20 to 100 independent measuring units.

9. System according to claim 1, wherein the at least one independent measuring unit fixed to the felt or on its support structure, is uniformly distributed on the felt.

10. System according to claim 1, wherein the at least one independent measuring unit fixed in a felt or on its support structure, is placed between two layers of felt.

11. Method of operating a computing device connected to a communication transceiver of a central acquisition unit of the felt monitoring system of claim 1, comprising:
    Retrieving felt sensor data from the connection to the central acquisition unit;
        displaying said sensor data in a display screen interface; verifying the authentication key in order to validate if an approved felt is installed;
    performing configuration parameters of the central acquisition unit and also the independent measuring units attached to it; and
    controlling different parameters of at least one related factory equipment, connected in the network.

* * * * *